Dec. 6, 1949 W. DUBILIER 2,490,730
DEVICE FOR ELECTRICALLY TREATING LIQUIDS
Filed Feb. 12, 1946 2 Sheets-Sheet 1
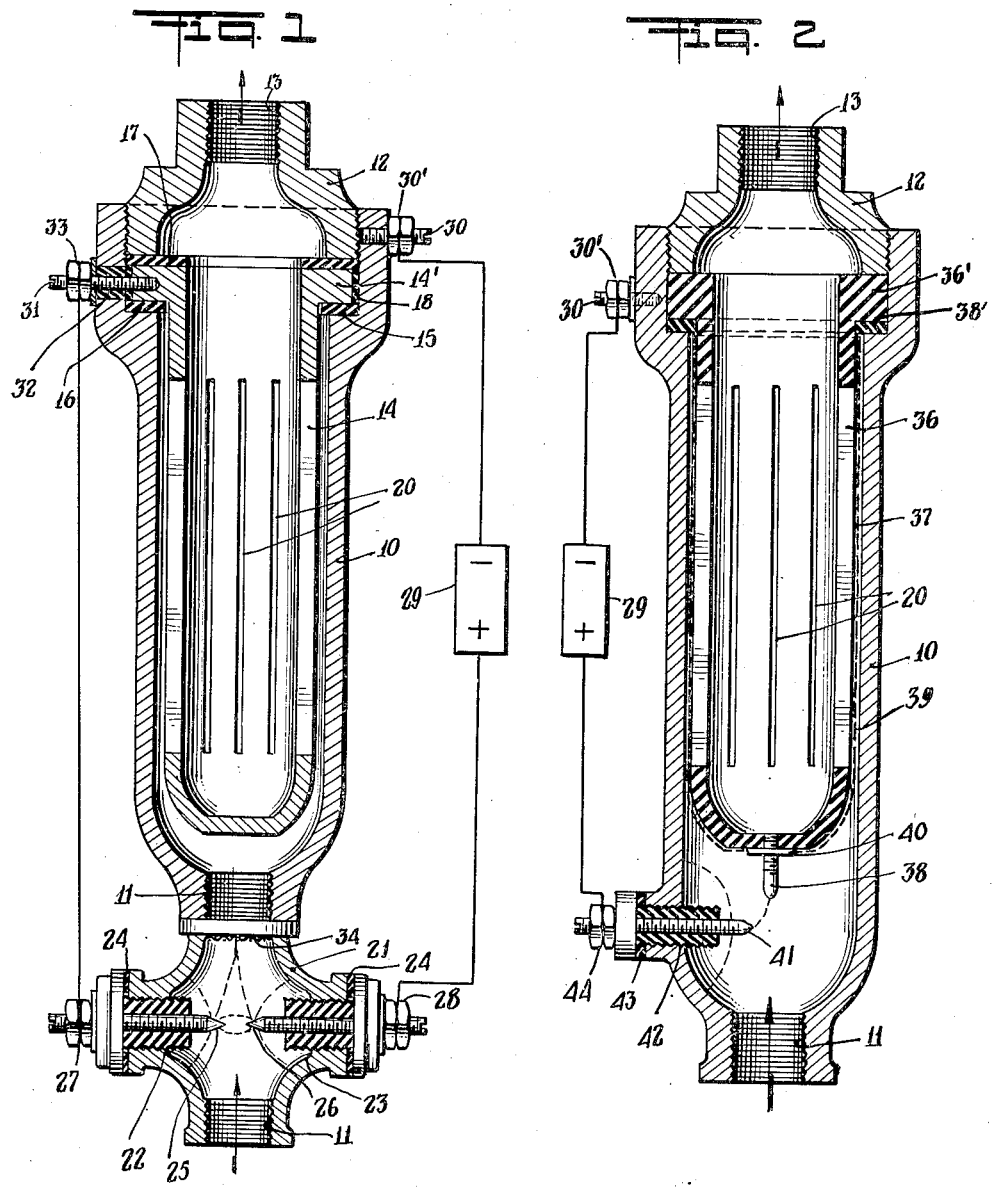
INVENTOR.
William Dubilier
BY
ATTORNEY Dec. 6, 1949 W. DUBILIER 2,490,730
DEVICE FOR ELECTRICALLY TREATING LIQUIDS
Filed Feb. 12, 1946 2 Sheets-Sheet 2
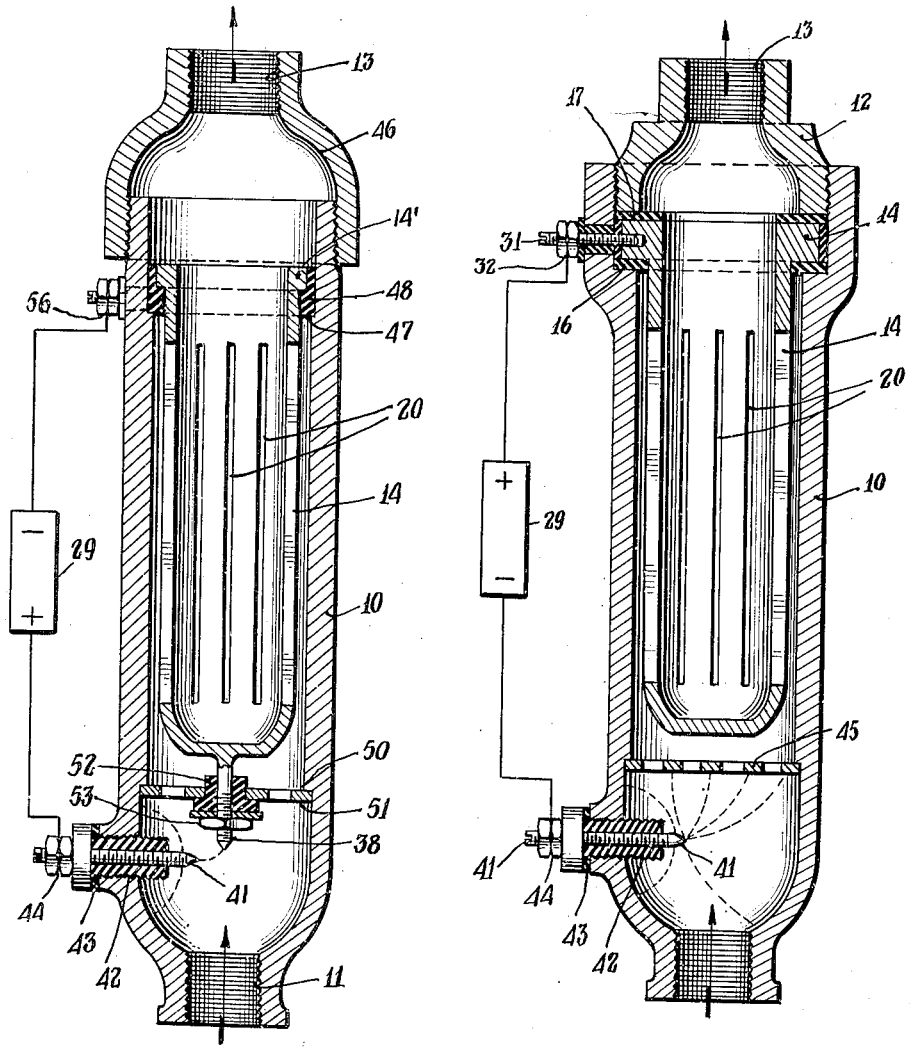
INVENTOR.
William Dubilier
BY
ATTORNEY Patented Dec. 6, 1949

2,490,730

UNITED STATES PATENT OFFICE 2,490,730

DEVICE FOR ELECTRICALLY TREATING LIQUIDS

William Dubilier, New Rochelle, N. Y.

Application February 12, 1946, Serial No. 647,115

2 Claims. (Cl. 204—305)

The present invention relates to improvements in devices for the electrical treatment of water and other fluids containing undesirable impurities to reduce or eliminate the effects of hardness thereof and other defects attributable to the presence of such impurities. More particularly, in the case of hard water containing calcium carbonate, magnesium carbonate and other mineral matter in solution, the special electrical treatment results largely in the prevention of scale in boilers, evaporators, pipelines, etc., as well as the elimination of other defects due to the presence of mineral matter in the ordinary water supply systems.

More particularly, the invention is concerned with electrical water treating devices of the special type wherein the water is passed on its way to the consumer between a pair of metallic electrodes which are maintained at a predetermined critical electrical potential difference supplied by a battery or other source and being of a low enough value to avoid corrosion effects, electrodeposition or decomposition of the electrodes by electrolysis, oxidation and other undesirable chemical actions.

According to a known arrangement of this type, as more specifically described in United States Patent No. 2,207,583, the water is conveyed on its way to the consuming means, substantially without chemical change, over a first electrode (anode) connected to the positive pole of a unidirectional current source furnishing a voltage of operating potential difference of the order of a few millivolts, said source having its negative pole connected to a cooperating electrode (cathode) also disposed in contact with the water stream.

The actual phenomena taking place and the function underlying this method of electrically treating or conditioning water are not yet fully understood. All indications, however, obtained from numerous tests and extensive practical use are that the action taking place is essentially physical rather than chemical, due evidently to the low treating potentials or current density to which the water is subjected, precluding electrolysis or other actions of a purely chemical nature.

According to one explanation or theory of operation, the positive calcium or magnesium ions and the negative carbonate ions or the ions of any other ionic impurity dissolved in the water, upon coming in contact with or into close proximity to the electrodes, receive or give off one or more electron charges so as to become neutral atoms or radicals. If a sufficient number of ions are thus electrically neutralized or rendered chemically inert, their subsequent precipitation in the form of an ionic crystal lattice upon evaporation of the water is substantially impeded or prevented, with the result, in the case of a boiler or other heating device, that the impurities will be deposited in the form of an amorphous colloidal or flocculent mass rather than as a rigid crystalline substance or scale. This amorphous mass can be easily removed by blow-down or wash-out, such as by the water stream itself. This function and operation has been largely confirmed by the fact that the more water is allowed to come into contact with the electrodes, especially the anode, the better will be the results obtained. For this reason the treating device is advantageously so constructed as to provide relatively large electrode surfaces disposed at a close distance, such as in the form of concentric cylinders between which the water is passed on its way to the consumer.

While the use of direct current has been found to be superior to alternating current, the use of the latter is not excluded. When using alternating current, it is assumed that a rectifying effect at the junction between the electrodes and liquid takes place, which results in a direct current potential and an action similar to that described above.

This treatment of the ionic impurities present in so called hard water to render them chemically inert and electrically neutral has been found to result in other desirable effects in connection with various uses of the water so treated and, in fact, in view of the minute electrical energy transfer involved, the action may be compared with that of a catalyst in effecting or modifying chemical and/or other reactions. Thus, it was found that water electrically treated in the above manner enables a substantial reduction in the amount of soap required to produce a good lather and in preventing the formation of a curd or smudge known in the form of so-called bathtub rings, in preventing undesirable sludge in aqueous solutions, and other undesirable effects directly attributable to the hardness of the water being used. For this reason, devices of the type according to the invention are sometimes compared with ordinary water softeners, but their use in practice, as will be understood, has a substantially greater scope and field of application.

In water treating devices of the above type, it is customary to use a battery or small rectifying unit connected to an alternating current power line for providing the required treating or operating potential through a voltage drop or bleeder resistance of proper value to result in the required critical treating potential difference between the electrodes in contact with the water stream (about 12 millivolts or less). By the proper adjustment of this resistance, which may be in the form of the well known variable electrical resistors and is connected in series with the electrode gap, the current source, and a microammeter, the correct treating potential difference is obtained by adjusting said resistance to obtain a predetermined current flow through the microammeter for a given type of treating device and characteristics, i. e. electrical conductivity of the water being treated. The resistance may be readjusted from time to time to maintain the device at optimum operating condition.

Since the quality of the water or the composition and amount of the impurities vary in different locations or from time to time at the same location or in the same water supply, a constant supervision and readjustment will be required to insure and maintain optimum results.

An object of the present invention is therefore the provision of an improved water treating device of the above character which may be prefabricated or provided with a simple attachment so as to automatically maintain a desired treating potential difference, substantially independently of the location or characteristics of the water being treated, and to require a minimum of adjustments and supervision during its entire use or life.

In my copending application Serial No. 597,695, filed June 5, 1945, entitled Fluid treating device, there has already been described a device of this nature using a series bleeder resistance in the form of an auxiliary water column shunted across the main water passage through the device. Since the voltage drop through the series resistance is determined in a known manner by the ratio of this resistance to the resistance of the main water gap or column enclosed by the treating electrodes, a change in the water conductivity due to different degrees of hardness or other causes will have no effect on this ratio, since the same change occurs in both the auxiliary and main water columns connected in series and across the voltage source. Accordingly, therefore, the voltage across the main treating electrodes depends only upon the geometrical design, i. e., the cross section and length of or space enclosed by the two water columns or gaps. Thus, by designing the device in such a manner that the distance and area of the gap is so arranged that the resistance is about a thousand times greater than the resistance of the main treating electrodes when the liquid is flowing through the gap and main electrodes, then a reduction of the battery or other supply voltage to $1/1000$ its value will be maintained under any operating conditions independently of the composition or conductivity of the water or other fluid being treated. When using a standard dry cell of 1.5 volts, this will result, therefore, in a treating potential difference of about 1.5 millivolts, which was found in some cases to produce optimum results under most practical conditions.

The use of an auxiliary water column in shunt with the main water path, as embodied in the construction shown in the above-mentioned application, results in a narrow cross-section of said column in order to obtain the required high resistance through the auxiliary path. This in turn may cause difficulties due to clogging of the narrow shunt path so as to require supervision and frequent cleaning, i. e., defeating in part the very purpose the device is intended to serve.

By the improved construction according to the present invention, the auxiliary series resistance is placed directly in the main water stream so as to become self-cleaning and prevent clogging and to result in other advantages and simplification in the design and operation of the device, as will become obvious from the following.

Other objects and novel aspects of the invention will in part become apparent and in part be particularly pointed out as the following detailed description proceeds, taken in reference to the accompanying drawings forming part of this specification and wherein all the figures are cross-sectional views of several modifications of a water treating device constructed in accordance with the principle of the invention.

Like reference characters identify like parts in the different views of the drawings.

Referring more particularly to Figure 1, there is shown a cylindrical casing 10 having an inlet opening internally threaded as shown at 11 and an upper enlarged portion closed by a screw-on cap 12 having an outlet opening threaded as shown at 13. In this manner, casing 10 may be connected in a standard pipeline supplying water from a source to a consumer in the direction as indicated by the arrows in the drawing. Concentrically mounted within casing 10 and in spaced relation thereto is a hollow cup-shaped electrode 14 provided with an upper flange 14' which rests against an inner shoulder 15 of casing 10 and is held or clamped in position by the cap 12 in the manner shown and understood from the drawing.

Electrode 14 forming the anode of the device is electrically insulated from the casing 10 acting as the cathode by the provision of insulating washers or gaskets 16 and 17 arranged at both sides of the flange 14' and a layer 18 of insulating material affixed to the outer cylindrical portion of the flange 14'. Gaskets 16 and 17 have the further purpose of providing a liquid-tight joint between the casing 10 and cap 12. The anode 14 is provided with suitable apertures such as longitudinal slots 20, whereby to allow the water stream or other fluid entering from the bottom of the device to pass between the electrodes 10 and 14 and through the slots 20 to the outlet cap 12. Such a construction insures a maximum of water to be exposed to or come in contact with the electrode surfaces, especially the anode 14, whereby a maximum of the water or other fluid will be affected and subjected to neutralization and subsequent colloidalization of the impurities in the manner described hereinabove.

In order to reduce the voltage of a standard dry cell or other source to the required critical value to be applied between the electrodes 10 and 14, i. e., less than about 12 millivolts, there is provided in accordance with the invention a detachable liquid resistance unit comprising, in the example shown, a casing 21 adapted to be screwed on or otherwise connected to the inlet of casing 10, on the one hand, and to the supply line, on the other hand, in such a manner as to cause the water stream to pass in succession through the casings 21 and 10, as indicated by the arrows in the drawing. Arranged within casing 21 at opposite sides of the water stream are a pair of flanged insulating plugs 22 and 23 of a molded plastic or the like and mounted in the side walls of the casing by screw joints, as shown or in any other suitable manner, with gaskets 24 adjoining the flanges of said plugs to effect a liquid-tight joint. A pair of threaded metal electrode rods 25 and 26 are mounted centrally within the plugs 22 and 23 and serve as electrodes for the auxiliary liquid resistance by projecting transversely and to a suitable distance into the water stream in the manner shown in the drawing.

The distance between the inner suitably pointed ends of the electrodes 25 and 26 is adjusted to obtain a desired resistance in relation to the resistance between the main treating electrodes 10 and 14. Clamping nuts 27 and 28 engaging the projecting ends of the electrode rods 25 and 26 are provided for connecting the auxiliary resistance to the battery and the main electrodes. The electrical connection to the outer electrode or cathode is made through a threaded stud 30 engaging a tapped hole in the upper enlarged portion of the casing and being provided with clamping nuts 30' for connecting a wire conductor or the like. Likewise, connection of the anode 14 is made by the provision of a further threaded rod 31 insulatingly mounted in the enlarged upper portion of the casing 10 by the provision of a flanged insulating sleeve 32, said rod engaging a tapped hole in the flange 14' of the anode 14 and being provided with clamping nuts 33 engaging its projecting end for connection to a wire or similar electrical conductor.

In the example shown in Figure 1, the positive pole of a dry battery 29 or other voltage source is connected to the terminal 26 of the fluid resistance, whose other terminal 25 is connected to the anode 14 by directly connecting the terminal units 27 and 33. The negative pole of the battery is connected to the casing terminal 30' which is at ground or zero potential. There is thus established an electric current flow from the positive pole of the battery through the auxiliary fluid resistance 25—26, the main electrode resistance between the electrodes 14 and 10 and back to the negative side of the battery. By the proper adjustment of this current by regulating the length of the auxiliary resistance, such as by the aid of a screw-driver or the like engaging the outer slotted ends of the electrodes 25 and 26, the potential drop between the main electrodes may be adjusted to be a predetermined fraction of the total voltage supplied by the source 29. In practice, a voltage of about 1.5 millivolts between the electrodes 10 and 14 has been found to insure optimum results and once the device has been adjusted to this value for a given battery voltage, no further control or supervision will be required, inasmuch as the ratio of voltage distribution upon the main and auxiliary water resistance paths will remain constant irrespective of the conductivity of the water as pointed out above. This is due to the fact that the same water determines the resistance between the auxiliary electrodes 25 and 26 and the main electrodes 10 and 14 so that changes in the water conductivity will not affect the ratio between the respective resistances. At the same time, the location of the auxiliary electrodes 25—26 in the main water stream results in a constant cleaning and supply of fresh water, whereby to prevent clogging and to insure equality of the conductivity in the auxiliary and main resistance paths under all circumstances.

In addition to the electric current directly passing between the auxiliary electrodes 25 and 26, a certain fraction of the total battery current will be directly by-passed to the casing 21 or ground, as indicated by the dotted lines in the drawing representing the approximate course of the current paths. Since, however, normally the shunt resistance to ground or casing 10, by the proper design of the device, will be a substantial multiple of the resistance between the auxiliary electrodes 25 and 26, the presence of the shunt current and its effect upon the voltage distribution between the series and main water gaps will be negligible, at least within the tolerance range of the treating potential difference between the electrodes 10 and 14. In order to prevent the by-pass current from directly passing to the anode 14, there is advantageously provided a metal screen or sieve 34 closing the inlet opening of the cathode or casing 10.

Referring to Figure 2, there is shown a modified construction of a water treating device according to the invention which differs from Figure 1 by the use of an anode structure 36 consisting of insulating material such as a molded plastic or the like and advantageously produced by a molding operation. The surface of this unit is coated with a metallic layer, such as, for example, as an outer coating of tin or other suitable metal, shown in dashed lines 39, by means of any one of the well known metal coating processes. The use of such an anode results in reduced costs and simplified construction and the elimination of special insulating washers or gaskets. If desirable, a single gasket 36' may be provided to insure a liquid-tight joint or a simple mechanical joint, where the leakproof connection is provided by the threaded joint between cap 12 and casing 10. Coating 39 should cover the outer surface of the anode 37 to a point close to the flange 36', as indicated in the drawing, as well as the inner walls of the slots 20 and preferably also the inner anode surface.

With either type of construction shown in Figures 1, 2 or 4, the anode may be provided with a projection 38 either integral with or otherwise secured thereto in any suitable manner. Where the metal is coated on an insulating member as shown in Figure 2, the projection 38 can be either part of the molding and coated similarly to the anode, or a separate stud mechanically and electrically attached to the anode may be provided. Since the water pressure on both sides of the anode is about the same, the anode may be made of relatively light construction to provide sufficient mechanical strength and to enable convenient handling during manufacture and assembly.

Furthermore, the auxiliary fluid resistance unit in Figure 2 is shown directly structurally combined with the treating device instead of constituting a separate detachable unit as in the case of Figure 1. There is provided for this purpose a first rod-shaped electrode 38 concentric to and depending from the anode 36 and secured thereto in any suitable manner such as by directly screwing it into the anode, a metal washer 40 being provided to effect electrical connection with the metal coating 37. The cooperating electrode 41 is shown mounted in a side wall of the cathode 10 by the provision of an insulating plug 42 liquid-tightly mounted in a tapped hole in an enlarged wall section of the casing and provided with a gasket 43 in the manner readily understood from the drawing. Clamping nuts 44 engaging the projecting end of the electrode rod 41 serve to make electrical connection with the positive pole of the dry cell 29 whose negative pole is connected to the cathode or casing 10 in the same manner as in Figure 1.

Figure 3 is substantially similar to Figure 2 with the exception that the electrode rod 41 is connected to the negative pole of the dry cell 29 or other voltage source whose positive pole is connected to the anode in a manner similar to that shown in Figure 1. In this manner, a separate direct shunt path to ground as in the case of Figures 1 and 2 is avoided and the total battery current passed in series through the main gap between the electrodes 14 and 10 and back to the negative pole by way of the auxiliary resistance between electrodes 38 and 41, as indicated by dotted lines in the drawing. In this case, the electrode 38 of Figure 2 may be dispensed with and advantageously replaced by a metallic screen or sieve 45 at cathode potential and arranged in front of the anode 14. This will prevent a direct current from flowing from the anode 14 and the auxiliary electrode 41. In a device of this type, the cathode or casing 10 is at a potential intermediate the plus and minus potentials of the battery 29, and since the casing is usually in contact to ground, the battery should be carefully insulated to prevent leakage to ground, as will be understood. The advantage of this construction over the constructions of Figures 1 and 2 is due to the fact that the auxiliary gap, after having once been adjusted in relation to the main gap, will at all times provide exactly the same voltage reduction or drop, independently of changes of the water at different locations or during different time periods.

Figure 4, being similar to Figure 2 as regards the arrangement of the auxiliary fluid resistance, shows a modified method of mounting the anode 14. Also, a different type of outlet cap 46 is shown directly screwed onto the externally threaded upper portion of the casing 10. The latter is furthermore provided with a first inner shoulder 47 against which is placed a stepped insulating washer 48 adapted to receive the upper flange 14' of the anode 14. Casing 10 is furthermore provided with a second inner off-set or shoulder 50 against which is placed an apertured metal ring or disk 51 having a central opening for passing the electrode rod 38 depending centrally from and shown to be integral with the anode 14. Rod 38 is insulated from the disk 51 by passing through a flanged insulating plug or washer 52 placed in the opening of disk 51. The entire assembly is clamped into rigid connection with the shoulders 47 and 50 of casing 10 by the provision of a clamping nut 53 screwed onto the lower threaded end of rod 38 and against the flange of plug 52. Items 55 and 56 represent a threaded terminal stud and clamping nuts for effecting connection to the outer electrode or cathode, similar to items 30 and 30' of Figure 2. Other details will be readily understood and are obvious from the above.

As is understood, an additional series resistance of either the fixed or variable type may be inserted in the electric circuit for adjusting the current through the device so as to result in the correct operating potential difference between the main anode and cathode in the manner explained hereinabove. Such additional resistance, in the case of Figure 1, is preferably inserted in the connecting lead between the terminals 27 and 33 so as to affect only the current passing between the anode 14 and cathode 10 without varying the direct or by-pass current to the cathode. In the construction according to Figure 3, the additional resistance may be inserted in either the positive or negative lead of the battery 29 to control the single current flow through the device.

In order to prevent disturbing galvanic potential differences interfering with the main operating voltage supplied by the battery or other source, the electrode potentials at the various interfaces between the liquid and metal electrodes are kept at a minimum by using electrode metals of low electrode potential such as nickel, tin, lead, copper, etc., or by coating the electrodes with a metal of low electrode potential. Alternatively, by using the same metal or metal alloy for the cooperating electrodes, the electrode potentials at the interface between both electrodes and the liquid will be equal and opposite, whereby to result in the complete elimination of any potential difference in the circuit due to the electrode potentials at the interface of the liquid and metal surfaces. In the latter case, the only active electromotive force in the circuit will be that supplied by the battery 29 so that a desired operating potential difference may be maintained between the main operating electrodes independently of any existing electrode potentials in the circuit. These precautions to reduce or eliminate the effect of electrode potentials apply equally to the main operating electrodes as well as the auxiliary electrodes forming the fluid series resistance in accordance with the invention.

While I have described a few desirable embodiments of my invention, it will be evident from the foregoing that the novel concept and underlying principle disclosed is susceptible of numerous variations and modifications varying in size, shape and dimensions and using alternative and equivalent elements, in accordance with the broader scope and spirit of the invention as defined in the appended claims. The specification and drawings are accordingly to be regarded in an illustrative rather than a limiting sense.

I claim:

1. The combination with a liquid treating device of the type comprising a first hollow cylindrical main electrode, a second cylindrical main electrode of lesser diameter and length and concentrically and insulatingly mounted within said first electrode, inlet and outlet means for said first electrode for passing a liquid to be treated between and in contact with said electrodes; of means for maintaining a relatively low voltage between said electrodes substantially independent of variations of the electrical characteristics of the liquid being treated, comprising an auxiliary electrode liquid-tightly and insulatingly mounted in said first electrode, said auxiliary electrode being located exteriorly of the intervening space enclosed by said main electrodes and exposed in contact with the main liquid stream passing through said device, means including circuit connections insulatingly passed through said first electrode to connect one pole of a relatively high voltage source to said second main electrode and to connect the other pole of said source to said auxiliary electrode, and a perforated member intermediate said second main electrode and said auxiliary electrode and being in electrical contact with said first main electrode to electrically screen said auxiliary electrode from said second main electrode.

2. The combination with a liquid treating device of the type comprising a hollow cylindrical cathode, a cylindrical anode of lesser diameter and length than and concentrically and insulatingly mounted within said cathode, inlet and outlet means for said cathode for passing a liquid to be treated between and in contact with said cathode and anode; of means for maintaining a relatively low voltage between said anode and cathode substantially independent of variations of the electrical characteristics of the liquid being treated, comprising an auxiliary electrode liquid-tightly and insulatingly mounted in said cathode, said auxiliary electrode being located exteriorly of the intervening space enclosed by said anode and cathode and being exposed in contact with the main liquid stream passing through said device, means including electric circuit connections insulatingly passed through said cathode to connect a source of relatively high voltage to said anode and auxiliary electrode, and a perforated disc intermediate said anode and auxiliary electrode and arranged transversely to and electrically and mechanically connected to said cathode.

WILLIAM DUBILIER.

REFERENCES CITED

The following references are of record in the file of this patent:

UNITED STATES PATENTS

| Number | Name | Date |
|---|---|---|
| 943,188 | Hartman | Dec. 14, 1909 |
| 1,930,830 | Twombly | Oct. 17, 1933 |
| 2,207,583 | Freeborn | July 9, 1940 |

FOREIGN PATENTS

| Number | Country | Date |
|---|---|---|
| 631,137 | Germany | June 12, 1936 |